United States Patent [19]

Newkirk et al.

[11] Patent Number: 5,015,609
[45] Date of Patent: May 14, 1991

[54] CERAMIC COMPOSITE STRUCTURES HAVING INTRINSICALLY FITTED ENCASEMENT MEMBERS THEREON AND METHODS OF MAKING THE SAME

[75] Inventors: Marc S. Newkirk, Newark; H. Daniel Lesher, Wilmington, both of Del.

[73] Assignee: Lanxide Technology Company, LP, Newark, Del.

[21] Appl. No.: 331,280

[22] Filed: Mar. 30, 1989

Related U.S. Application Data

[60] Division of Ser. No. 212,071, Jun. 24, 1988, Pat. No. 4,822,759, Continuation of Ser. No. 908,073, Sep. 16, 1986, abandoned.

[51] Int. Cl.$^5$ .............................................. C04B 35/58
[52] U.S. Cl. ....................................... 501/127; 501/153; 501/89; 501/96; 501/134; 42/76.02
[58] Field of Search .................................. 264/56-58, 264/59-60; 42/76.02; 89/16; 501/89, 87, 88, 94, 96, 98, 127, 128, 134, 153, 80

[56] References Cited

U.S. PATENT DOCUMENTS

| | | | |
|---|---|---|---|
| 2,389,061 | 11/1945 | Kuzmick | 106/71 |
| 2,741,822 | 4/1956 | Udy . | |
| 3,098,723 | 7/1963 | Micks | 501/95 |
| 3,255,027 | 6/1966 | Talsma . | |
| 3,296,002 | 1/1967 | Hare . | |
| 3,298,842 | 1/1967 | Seufert . | |
| 3,419,404 | 12/1968 | Mao . | |
| 3,421,863 | 1/1969 | Bawa . | |
| 3,437,468 | 4/1969 | Seufert . | |
| 3,473,938 | 10/1969 | Oberlin . | |
| 3,473,987 | 10/1969 | Sowards . | |
| 3,789,096 | 1/1974 | Church . | |
| 3,864,154 | 2/1975 | Gazza et al. . | |
| 3,973,977 | 8/1976 | Wilson . | |
| 4,435,455 | 3/1984 | Prewo et al. | 89/16 |
| 4,641,450 | 2/1987 | Moll et al. | 89/16 |
| 4,669,212 | 6/1987 | Jackson et al. | 89/16 |
| 4,695,321 | 9/1987 | Akashi et al. | 501/99 |
| 4,715,422 | 12/1987 | Tommis et al. | 501/95 |
| 4,722,825 | 2/1988 | Goldstein | 89/16 |
| 4,736,276 | 4/1988 | Ushifuse et al. | 501/128 |
| 4,795,673 | 1/1989 | Frechette et al. | 501/88 |

FOREIGN PATENT DOCUMENTS

0116809 8/1984 European Pat. Off. .
0155831 9/1985 European Pat. Off. .
0169067 1/1986 European Pat. Off. .

OTHER PUBLICATIONS

"Oxidation of Molten Aluminum Alloys. Reaction with Refractories"—M. Drouzy and M. Richard—Mar., 1974—Fonderie, France No. 332, pp. 121-128.
"Refractories for Aluminum Alloy Melting Furnances'—'—B. Clavaud and V. Jost—Sep. 1980—Lillian Brassinga (from French) Jan. 1985.

*Primary Examiner*—Olik Chaudhuri
*Assistant Examiner*—Andrew Griffis
*Attorney, Agent, or Firm*—Mark G. Mortenson; Michael K. Boyer

[57] ABSTRACT

A method is provided of producing a self-supporting ceramic composite structure having one or more encasement members, such as an encasing steel sleeve, joined to it by growth of the ceramic material to engagement surface(s) of the encasement member(s). A parent metal is contacted with a body of filler which is encased by the encasement member(s). The resulting assembly is heated to melt and oxidize the parent metal, e.g., aluminum, to form a polycrystalline material comprising an oxidation reaction product which grows through the body of filler and stops at the engagement surface(s) of the encasement member(s) which thereby determines the surface geometry of the grown ceramic matrix. Upon cooling, the encasement member(s) is shrink-fitted about the ceramic composite body. The invention also provides the resultant articles, for example, a ceramic composite body having a stainless steel member affixed thereto.

18 Claims, 1 Drawing Sheet

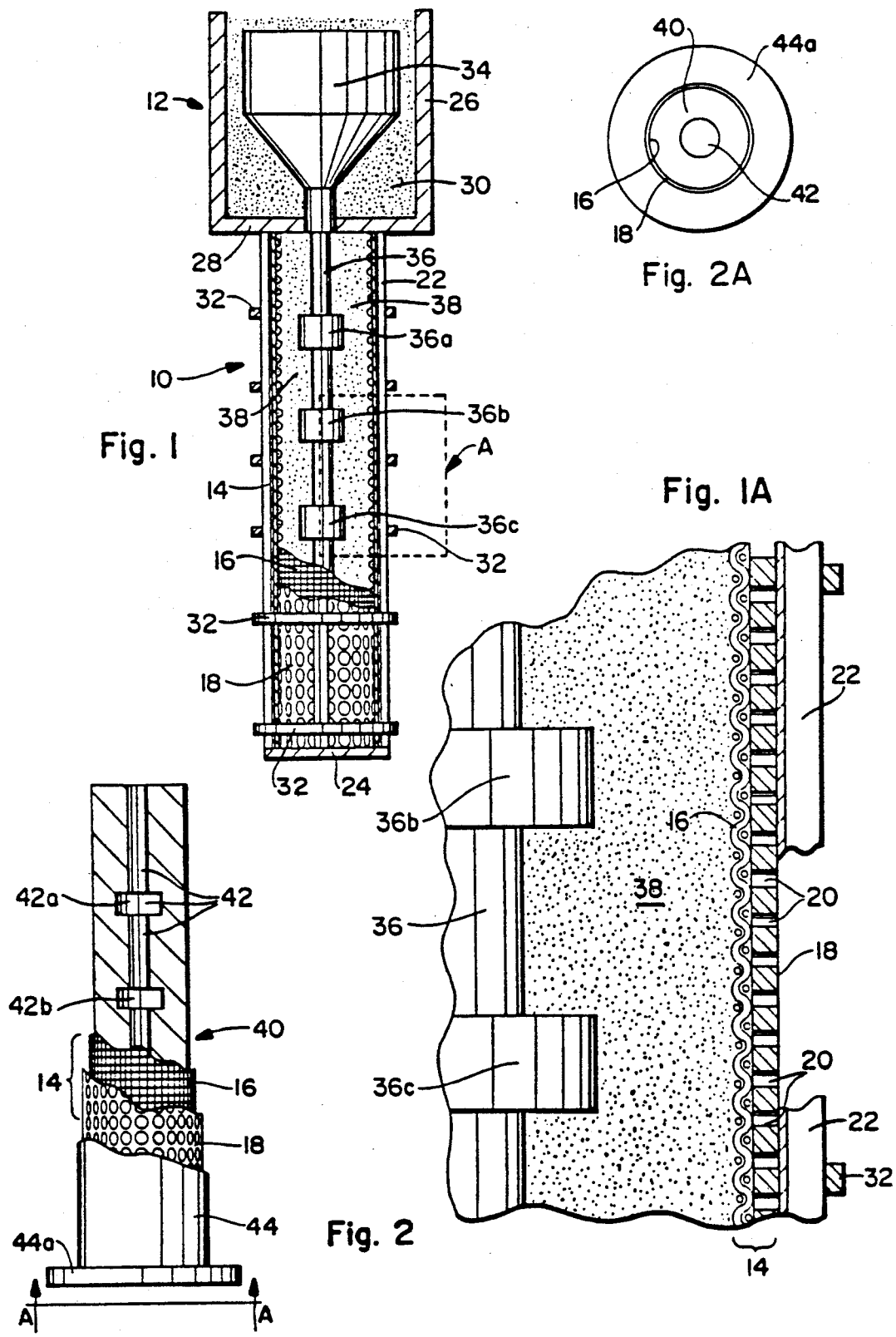

CERAMIC COMPOSITE STRUCTURES HAVING INTRINSICALLY FITTED ENCASEMENT MEMBERS THEREON AND METHODS OF MAKING THE SAME

This is a divisional of co-pending application Ser. No. 212,071 filed on Jun. 24, 1988, now U.S. Pat. No. 4,822,759, which in turn is a Rule 62 Continuation of U.S. application Ser. No. 908,073 filed on Sept. 16, 1986, now abandoned.

BACKGROUND OF THE INVENTION

1. Field of the Invention

The present invention broadly relates to ceramic composites having an encasement member for maintaining the composite under compressive stress, and to methods of making the same. In particular, the invention relates to ceramic composites comprising a polycrystalline ceramic matrix embedding a filler and having an encasement member for maintaining the ceramic composite under compressive stress, and to methods of making the composites.

2. Description of Commonly Owned Patent Applications

The subject matter of this application is related to that of Commonly Owned U.S. patent application Ser. No. 819,397, filed Jan. 17, 1986, which issued on Jul. 25, 1989, as U.S. Pat. No. 4,851,375 as a continuation-in-part of Ser. No. 697,876, filed Feb. 4, 1985, now abandoned, both in the names of Marc S. Newkirk et al and entitled "Composite Ceramic Articles and Methods of Making Same." This copending application discloses a novel method for producing a self-supporting ceramic composite by growing an oxidation reaction product from a parent metal into a permeable mass of filler.

The method of producing a self-supporting ceramic body by oxidation of a parent metal precursor is disclosed generically in Commonly Owned U.S. Pat. No. 4,713,360 which issued on Dec. 15, 1987 and was based on U.S. patent application Ser. No. 818,943, filed Jan. 15, 1986, as a continuation-in-part of Ser. No. 776,964, filed Sept. 17, 1985, now abandoned as a continuation-in-part of Ser. No. 705,787, filed Feb. 26, 1985, now abandoned, as a continuation-in-part of Ser. No. 591,392, filed Mar. 16, 1984, now abandoned all in the name of Marc S. Newkirk et al and entitled "Novel Ceramic Materials and Methods of Making The Same." This discovery of an oxidation phenomenon, which may be enhanced by the use of a dopant alloyed in the parent metal, affords self-supporting ceramic bodies of desired size grown as the oxidation reaction product of the precursor parent metal.

The foregoing method was improved upon by the use of external dopants applied to the surface of the precursor parent metal as disclosed in Commonly Owned U.S. patent application Ser. No. 220,935, filed Jun. 23, 1988, which issued on Aug. 1, 1989, as U.S. Pat. No. 4,853,352 which is a continuation of Ser. No. 822,999, filed Jan. 27, 1986, as a continuation-in-part of Ser. No. 776,965, filed Sept. 17, 1985, now abandoned as a continuation-in-part of Ser. No. 747,788, filed Jun. 25, 1985, now abandoned as a continuation-in-part of Ser. No. 632,636, filed Jul. 20, 1984, now abandoned all in the names of Marc S. Newkirk et al and entitled "Methods of Making Self-Supporting Ceramic Materials."

A further development of the foregoing methods enables the formation of self-supporting ceramic structures which contain therein one or more cavities which inversely replicate the geometry of a positive mold of shaped precursor parent metal embedded within a bed of conformable filler which is self-bonding under specified conditions as described in Commonly Owned U.S. patent application Ser. No. 823,542, filed Jan. 27, 1986, now U.S. Pat. No. 4,828,785 in the name of Marc S. Newkirk et al, entitled "Inverse Shape Replication Method of Making Ceramic Composite Articles and Articles Obtained Thereby."

Yet another development of the foregoing methods enables the formation of self-supporting ceramic bodies having a negative pattern which inversely replicates the positive pattern of a parent metal precursor emplaced against a mass of filler, as described in Commonly Owned U.S. patent application Ser. No. 896,157, filed Aug. 13, 1986 which issued on Aug. 22, 1989, as U.S. Pat. No. 4,859,640, in the name of Marc S. Newkirk and entitled "Method of Making Ceramic Composite Articles With Shape Replicated Surfaces and Articles Obtained Thereby."

The entire disclosures of all of the foregoing Commonly Owned Patent and Patent Applications and those described below are expressly incorporated herein by reference.

Background and Prior Art

In recent years, there has been increasing interest in the use of ceramics for structural applications historically served by metals. The impetus for this interest has been the superiority of ceramics with respect to certain properties, such as corrosion resistance, hardness, modulus of elasticity, and refractory capabilities when compared with metals.

Current efforts at producing higher strength, more reliable, and tougher ceramic articles are largely focused upon (1) the development of improved processing methods for monolithic ceramics and (2) the development of new material compositions, notably ceramic matrix composites. A composite structure is one which comprises a heterogeneous material, body or article made of two or more different materials which are intimately combined in order to attain desired properties of the composite. For example, two different materials may be intimately combined by embedding one in a matrix of the other. A ceramic matrix composite structure typically comprises a ceramic matrix which encloses one or more diverse kinds of filler materials such as particulates, fibers, rods or the like.

The Commonly Owned Patent and Patent Application describe new processes which resolve some of the problems or limitations of traditional ceramic technology for making composites such as by compacting and sintering. The present invention combines the processes of the Commonly Owned Patent and Patent Applications with additional novel concepts to provide for forming shaped ceramic composite structures having an encasement member formed integrally with the composite for maintaining it under compression. Further, the present invention provides for fabrication of ceramic composites of certain predetermined geometry by oxidation reaction phenomenon which overcomes the difficulties and limitations associated with known processes and further provides for an integral means formed in situ during the oxidation reaction process in maintaining the ceramic composite under compressive stress. It is known in the ceramic field that ceramics are generally much stronger in compressive strength than in tensile strength. If the ceramic is put under pressure, such as by applying pressure to the inside diameter of a ceramic tube, the ceramic is then put in tension. If a crack develops in the ceramic while under tension, the ceramic will shatter. Therefore, it is desirable to prevent this catastrophic failure, which can be accomplished by the method and product of this invention, by providing a compressive means formed in situ for maintaining the ceramic composite under compression.

It has long been known that favorably prestressed parts can appear very strong in application because stresses which such parts see in use may first actually serve to unload the prestress before effectively adding stress to the part. In the case of employing ceramics to tensile design applications, maximum design potential is achieved by prestressing such materials in compression, particularly since their compressive strengths may in some cases be a factor of 5 or more greater than their tensile strengths. Prior to the present invention, prestressing a ceramic part with a metal sleeve was a very costly and tricky business. The ceramic and metal component had to be a very close tolerance fit with near-perfect conformity between the two in order to generate the proper amount of uniform stress with respect to the ceramic and avoid the creation of very high contact stresses which could cause failure of the ceramic. Typically this condition has been only met by careful and expensive high-tolerance grinding of the ceramic part and metal sleeve at the surfaces where they interface. The present invention overcomes these problems and the need for such grinding by a novel technique as described herein.

SUMMARY OF THE INVENTION

In accordance with the present invention, there is provided a method for producing a ceramic composite body having an encasement member intrinsically fitted thereto for maintaining the composite under compressive stress. The ceramic matrix is obtained by oxidation of a parent metal to form a polycrystalline material comprising the oxidation reaction product of the parent metal with an oxidant and, optionally, one or more metallic constituents. In accordance with the method, a bedding of filler is superimposed onto a parent metal, and the bedding is surrounded at least partially by an encasement member. The parent metal is heated to a temperature region above its melting point but below the melting point of the oxidation reaction product to form a body of molten parent metal. The parent metal and bedding of filler are oriented with respect to each other so that formation of the oxidation reaction product will occur in a direction within the bedding of filler and towards the encasement. In the aforesaid temperature region, the molten parent metal reacts with the oxidant to form the oxidation reaction product, and at least a portion of the oxidation reaction product is maintained in contact with and extends between the molten metal and the oxidant to progressively draw molten metal through the oxidation reaction product towards the oxidant so that fresh oxidation reaction product continues to form within the body of filler at the interface between the oxidant and previously formed oxidation reaction product. The reaction is continued until the polycrystalline material has infiltrated the body of filler to the interior surface(s) of the encasement to produce the ceramic composite body. On cooling, the encasement member exhibiting intrinsic fit properties with respect to the composite body intimately engages the composite body, thereby placing the composite under compressive stress. A ceramic maintained under compression is advantageous in that it inhibits the development of tensile failure in the ceramic body, and additionally, prevents the catastrophic failure of the ceramic body.

As disclosed in the Commonly Owned Patent and Patent Applications, the polycrystalline oxidation reaction product has interconnected crystallites usually interconnected in three dimensions. In addition, a metallic component and/or porosity is distributed or dispersed through the ceramic body, which may or may not be interconnected, depending on process conditions, parent metal, dopant, etc.

The encasement member typically is chosen to have a larger coefficient of thermal expansion than that of the ceramic composite body whereby, upon cooling of the polycrystalline ceramic body and the encasement member, the encasement member tends to want to shrink faster than the ceramic composite body and, because of its intimate engagement with said body, imparts compression thereto. In one preferred embodiment, the encasement member, which may be made of steel, e.g., stainless steel, comprises a cylindrical member or sleeve for imparting a cylindrical configuration to the ceramic body.

The present invention also provides for self-supporting ceramic composite structure comprising a filler (e.g., preform) embedded in a polycrystalline ceramic matrix. The ceramic matrix is obtained by the oxidation reaction of a parent metal as the precursor with an oxidant, to form interconnected oxidation reaction product, and optionally one or more metallic constituents. An encasement member, superimposed onto the filler and integrally joined in situ with the ceramic matrix, is intrinsically fitted to the ceramic composite body for maintaining it under compressive stress.

"Ceramic" is not to be unduly construed as being limited to a ceramic body in the classical sense, that is, in the sense that it consists entirely of non-metallic and inorganic materials, but, rather it refers to a body which is predominantly ceramic with respect to either composition or dominant properties, although the body may contain minor or substantial amounts of one or more metallic constituents derived from the parent metal, or reduced from the oxidant or a dopant, most typically within a range of from about 1–40% by volume, but may include still more metal.

"Oxidation reaction product" generally means one or more metals in any oxidized state wherein a metal(s) have given up electrons to or shared electrons with another element, compound or combination thereof. Accordingly, an "oxidation reaction product" under this definition includes the product of reaction of one or more metals with an oxidant such as those described in this application.

"Oxidant" means one or more suitable electron acceptors or electron sharers and may be a solid, a liquid or a gas (vapor) or some combination of these, e.g., a solid and a gas at the process conditions.

"Parent metal" refers to that metal, e.g., aluminum, which is the precursor for the polycrystalline oxidation reaction product, and includes that metal as a relatively pure metal, a commercially available metal with impurities and/or alloying constituents, or an alloy in which that metal precursor is the major constituent; and when a specified metal is mentioned as the parent metal, e.g., aluminum, the metal identified should be read with this definition in mind unless indicated otherwise by the context.

"Intrinsic fit" (or the like) means the inherent property of the encasement member to apply compressive stress to the intimately engaged ceramic composite body upon cooling from the process conditions.

BRIEF DESCRIPTION OF THE DRAWINGS

FIG. 1 is a schematic, partially cross-sectioned view in elevation showing an assembly including reservoir and source parent metal bodies and an encasement member having a bed of filler contained therein;

FIG. 1A is a view on an enlarged scale and with a part broken away of that portion of the FIG. 1 assembly enclosed within dashed line area A of FIG. 1;

FIG. 2 is a partial cross-sectional view in elevation of a self-supporting ceramic composite structure having the encasement member intrinsically fitted thereto and made using the filler-bed assembly of FIG. 1 in accordance with the present invention; and FIG. 2A is a view taken along line A—A of FIG. 2.

DETAILED DESCRIPTION OF THE INVENTION AND PREFERRED EMBODIMENTS THEREOF

In the practice of the present invention, an assembly including a parent metal body is melted to provide a molten parent metal which is contacted with a body or mass of filler at least partly contained within an encasement member. The portion of the encasement member contacting the filler is referred to as the engagement surface of the encasement member. The encasement member may encase all or part of the body of filler, which may be a bed of loose, particulate filler or a shaped filler preform (as described below), and which contains or is permeated by an oxidant. The assembly is provided with an oxidizing environment and heated to a temperature region above the melting point of the parent metal but below the melting point of the oxidation reaction product of the parent metal. Upon contact with the oxidant, the molten parent metal reacts to form oxidation reaction product, thereby commencing the infiltration and embedment of filler within the growing polycrystalline material resulting from oxidation of the parent metal. Such oxidation, including embedment of a filler within the oxidation reaction product, is described in detail in the Commonly Owned and copending Patent and Patent applications.

In the practice of the present invention, the process is continued until the polycrystalline material has infiltrated and embedded the filler material and grown into contact with the engagement surface of the encasement member. In some cases, only a part of the resulting ceramic body is encased within the encasement member. In other cases, more than one encasement member may be filled by a single ceramic composite body. The shape of that portion of the ceramic composite body, if any, outside the encasement member(s) may be controlled by providing the filler, or an appropriate portion of the filler, as a shaped preform as described below, or by placing a bed of conformable filler within a shaped barrier means, for example, a barrier means of plaster of paris, as described in another copending and Commonly Owned Patent Application, namely, U.S. patent application Ser. No. 861,024, filed on May 8, 1986, in the names of Marc S. Newkirk et al and entitled "Method Of Making Shaped Ceramic Composites With The Use Of A Barrier." The barrier arrests the growth of the polycrystalline material formed by the oxidation reaction. As disclosed, a barrier means such as plaster of paris may be applied to the surface of a preform as well.

The parent metal may be arranged to provide a reservoir of parent metal which replenishes a first source of parent metal in contact with the body or mass of filler, in accordance with the methods disclosed in another copending and Commonly Owned Patent Application, U.S. patent application Ser. No. 908,067, filed concurrently on Sept. 16, 1986, in the names of Marc S. Newkirk et al and entitled "Reservoir Feed Method of Making Ceramic Composite Structures and Structures Made Thereby." The reservoir body of parent metal flows by gravity flow communication to replenish a first of source parent metal which has been consumed, at least partially during in the oxidation reaction process, thereby assuring that ample parent metal is available to continue the process until the desired amount of polycrystalline material is formed by the oxidation reaction. The resulting ceramic composite product includes the embedded filler and the intrinsically-fitted encasement member. The surface boundaries of the ceramic composite product within the encasement member may be defined at least partly by the geometry of the interior or engagement surface of the encasement member, when the latter encases the filler or a part thereof. In such case, the shape of the ceramic composite is congruent to the interior or engagement surface of the encasement member, which serves as a barrier means and thus determines the exterior geometry or shape of the ceramic composite structure much in the same way that the interior surface of a mold defines the exterior geometry of an object molded therein.

In some embodiments of the invention, the parent metal, or a portion thereof referred to as the parent metal source body, may be embedded within or placed in conforming engagement with a bed of conformable filler. The conformable filler conforms to the shape of the parent metal source body with the result (as explained in the above-described Commonly Owned Patent application Ser. Nos. 823,542 and 896,157) that the resulting ceramic composite structure has formed therein a negative pattern or one or more cavities which inversely replicate the shape or geometry of the parent metal source body. The parent metal source body may comprise one or more pieces and it may be a simple cylinder, bar, ingot or the like or it may be suitably shaped by any appropriate means, for example, a parent metal bar, billet or ingot may be suitably machined, cast, molded, extruded or otherwise shaped to provide a shaped parent metal source body. The parent metal source body may thus have one or more of grooves, bores, recesses, lands, bosses, flanges, screw threads and the like formed therein. It may also, or alternatively, have one or more collars, bushings, discs, bars or the like assembled thereto to provide any desired configuration. The negative pattern or cavity thus formed in the ceramic composite body will contain or be filled with parent metal which resolidifies as the structure is allowed to cool after processing. The resolidified parent metal may optionally be removed from the negative pattern or cavity containing it, as described below. The resulting shaped ceramic composite product thus comprises a filler embedded by a polycrystalline ceramic matrix and intrinsically fitted to one or more encasement members. The ceramic matrix itself optionally may include one or more non-oxidized constituents of the parent metal, or voids, or both and has a surface geometry of selected shape. (Non-oxidized constituents of parent metal optionally dispersed within the ceramic matrix are not to be confused with bulk resolidified parent metal left behind in the negative pattern or cavity impressed or formed in the bed of filler by the parent metal embedment body).

Although the invention is described below in detail with specific reference to aluminum as the preferred parent metal, other suitable parent metals which meet the criteria of the present invention include, but are not limited to, silicon, titanium, tin, zirconium and hafnium. For example, specific embodiments of the invention include, when aluminum is the parent metal, alpha-alumina or aluminum nitride as the oxidation reaction product; titanium as the parent metal and titanium nitride or titanium boride as the oxidation reaction product; silicon as the parent metal and silicon carbide, silicon boride or silicon nitride as the oxidation reaction product.

A solid, liquid, or vapor-phase oxidant, or a combination of such oxidants, may be employed. Typical vapor-phase oxidants include, without limitation, oxygen, nitrogen, a halogen, sulphur, phosphorus, arsenic, carbon, boron, selenium, tellurium, and compounds and combinations thereof, for example, silica (as a source of oxygen), methane, ethane, propane, acetylene, ethylene, and propylene (as sources of carbon), and mixtures such as air, $H_2/H_2O$ and $CO/CO_2$, the latter two (i.e., $H_2/H_2O$ and $CO/CO_2$) being useful in reducing the oxygen activity of the environment. Accordingly, the ceramic structure of the invention may comprise an oxidation reaction product comprising one or more of oxides, nitrides, carbides, borides and oxynitrides. More specifically, the oxidation reaction product may, for example, be one or more of aluminum oxide, aluminum nitride, silicon carbide, silicon boride, aluminum boride, titanium nitride, zirconium nitride, titanium boride, zirconium boride, silicon nitride, hafnium boride and tin oxide.

Although any suitable oxidants may be employed, specific embodiments of the invention are described below with reference to use of vapor-phase oxidants. If a gas or vapor oxidant, i.e., a vapor-phase oxidant, is used, the filler is permeable to the vapor-phase oxidant so that upon exposure of the bed of filler to the oxidant, the vapor-phase oxidant permeates the bed of filler to contact the molten parent metal therein. For example, oxygen or gas mixtures containing oxygen (including air) are preferred vapor-phase oxidants, as in the case where aluminum is the parent metal, with air usually being more preferred for obvious reasons of economy. When a vapor-phase oxidant is identified as containing or comprising a particular gas or vapor, this means an oxidant in which the identified gas or vapor is the sole, predominant or at least a significant oxidizer of the parent metal under the conditions obtained in the oxidizing environment utilized. For example, although the major constituent of air is nitrogen, the oxygen content of air is the sole or predominant oxidizer for the parent metal because oxygen is a significantly stronger oxidant than nitrogen. Air therefore falls within the definition of an "oxygen-containing gas" oxidant but not within the definition of a "nitrogen-containing gas" oxidant. An example of a "nitrogen-containing gas" oxidant as used herein and in the claims is "forming gas", which contains 96 volume percent nitrogen and 4 volume percent hydrogen.

When a solid oxidant is employed, it is usually dispersed through the entire bed of filler or through a portion of the bed adjacent the parent metal, in the form of particulates admixed with the filler, or perhaps as coatings on the filler particles. Any suitable solid oxidant may be employed including elements, such as boron or reducible compounds, such as silicon dioxide or certain borides of lower thermodynamic stability than the boride reaction product of the parent metal. For example, when a boron or a reducible boride is used as a solid oxidant for an aluminum parent metal, the resulting oxidation reaction product is aluminum boride.

In some instances, the oxidation reaction may proceed so rapidly with a solid oxidant that the oxidation reaction product tends to fuse due to the exothermic nature of the process. This occurrence can degrade the microstructural uniformity of the ceramic body. This rapid exothermic reaction can be avoided by mixing into the composition relatively inert fillers which exhibit low reactivity. Such fillers absorb the heat of reaction to minimize any thermal runaway effect. An example of such a suitable inert filler is one which is identical to the intended oxidation reaction product.

If a liquid oxidant is employed, the entire bed of filler or a portion thereof adjacent the molten metal is coated or soaked as by immersion in the oxidant to impregnate the filler. Reference to a liquid oxidant means one which is a liquid under the oxidation reaction conditions and so a liquid oxidant may have a solid precursor, such as a salt, which is molten at the oxidation reaction conditions. Alternatively, the liquid oxidant may be a liquid precursor, e.g., a solution of a material, which is used to impregnate part or all of the filler and which is melted or decomposed at the oxidation reaction conditions to provide a suitable oxidant moiety. Examples of liquid oxidants as herein defined include low melting glasses.

An oxidant which is liquid or solid at the process conditions may be employed in conjuction with the vapor-phase oxidant. Such additional oxidants may be particularly useful in enhancing oxidation of the parent metal preferentially within the filler bed or preform, rather than beyond its boundary surfaces. That is, the use of such additional oxidants may create an environment within the preform more favorable to the oxidation kinetics of the parent metal than the environment outside the preform. This enhanced environment is beneficial in promoting matrix development within the preform to the boundary and minimizing overgrowth.

The parent metal reservoir body may conveniently be contained within a bed of particulate inert material, which is inert or impermeable to the molten parent metal. The bed of inert material will thus contain the molten reservoir parent metal and feed it, typically through an opening in the bottom of the bed of inert material, to the source body embedded within the bed of filler material. For example, a cylindrical or hemispherical shaped parent metal reservoir body ingot may be placed with a protruding portion thereof atop the embedment body within the bed of filler.

Alternatively, the parent metal may be provided without regard to shaping it and inversely replicating it shape or part thereof in the ceramic composite body. Thus any form of parent metal may be used when the parent metal shape is not to be inversely replicated in the ceramic composite body. Therefore, the molten parent metal contacted with the mass of filler in such cases may be provided as molten metal or as a billet or ingot of any convenient available shape. The bed of filler may comprise a bed of conformable filler or a shaped filler preform. The configuration of the assembly may be such as to initially provide a sufficient supply of parent metal in contact with the filler or a reservoir body of parent metal may be provided to replace source parent metal contacting the filler as the molten parent metal migrates into the filler. If sufficient molten metal is supplied from the resevoir body to a source body which is embedded within or in conforming engagement with a conformable filler, upon termination of the reaction after the oxidation reaction product has grown to the desired size, the non-oxidized molten parent metal resolidifies and the cavity or negative pattern in the ceramic structure is filled with resolidified parent metal. However, if the total supply of parent metal is insufficient to maintain the cavity or negative pattern filled with parent metal, the cavity or negative pattern may be empty or only partially filled with resolidified parent metal. Any such resolidified parent metal may, if desired, be removed from the cavity negative pattern of the product ceramic composite in a subsequent processing step to provide a shaped composite having therein an empty cavity or pattern which inversely replicates the geometry of the source body of the parent metal.

The filler utilized in the practice of the present invention may be one or more of a wide variety of materials suitable for the purpose. The filler may be a "conformable" filler which term, as used herein and in the claims, means that the filler is one which can be emplaced within a container and will conform to the interior configuration of the container. A conformable filler can also conform to the parent metal source body embedded within, or placed into conforming engagement with, the filler, as described above. For example, if the filler comprises particulate material such as fine grains of a refractory metal oxide such as alumina, the filler will conform to the interior configuration of the container or encasement member in which it is emplaced. However, it is not necessary that the filler be in fine particulate form to be a conformable filler. For example, the filler could be in the form of fibers such as short chopped fibers or in the form of a fiber wool-like material, e.g., something like steel wool. The filler may also comprise a combination of two or more such geometric configuration, i.e., a combination of small particulate grains and fibers. To comprise a conformable filler as used herein, it is necessary only that the physical configuration of the filler be such as to permit the filler to fill and conform to the configuration of the interior surface of the barrier means container in which it is emplaced. Such conformable filler will also closely conform to the surfaces of the parent metal embedment body or portion thereof which is embedded within or in conforming engagement with the mass of conformable filler. Any useful shape or combination of shapes of filler may be employed, such as one or more of hollow bodies, particulates, powders, fibers, whiskers, spheres, bubbles, steel wool, plates, aggregate, wires, rods, bars, platelets, pellets, tubes, refractory fiber cloth, tubules, or mixtures thereof.

The filler may also comprise a shaped preform which is made in or formed into any predetermined or desired size and shape by any conventional method, such as slipcasting, injection molding, transfer molding, vacuum forming, or otherwise, by processing any suitable filler material(s) of the type more specifically identified and described elsewhere herein. The filler preform, which is permeable to growth therein of the polycrystalline material obtained from oxidation of the parent metal and to vapor-phase oxidants, may include or have incorporated therein a solid oxidant and/or a liquid oxidant which may be used in conjunction with the vapor-phase oxidant. The preform has a surface boundary, and should retain sufficient shape integrity and green strength to provide dimensional fidelity after being infiltrated by the ceramic matrix despite being permeable enough to accommodate the growing polycrystalline matrix. Preferably, the preform fillers have a porosity of between about 5 and 90% by volume, and more preferably between about 25 and 50%. The porous preform preferably should be capable of being wetted by the molten parent metal under process temperature conditions in order to encourage development of the polycrystalline material within the preform filler to produce a ceramic composite product of high integrity and well-defined borders.

The fillers from which the preform is made, such as ceramic powders or particulates, may be bonded together with any suitable binding agent, e.g., polyvinyl alcohol or the like, which does not interfere with the reactions of this invention, or leave undesirable residual by-products within the ceramic composite product. Suitable particulates, such as silicon carbide or alumina, having a grit or mesh size of from about 10 to 1000 or finer, or an admixture of mesh sizes and types, for example, may be used. The particulates may be molded by known or conventional techniques as by forming a slurry of the particulate in an organic binder, pouring the slurry into a mold, and then letting the part set as by drying at an elevated temperature.

More specifically, with respect to suitable materials that may be employed in the formation and manufacture of the permeable preform, the three classes of fillers described elsewhere herein are suitable materials for the permeable preform filler.

Whether the filler is a preform filler or is a loose packed bed or mass of conformable filler, one or more encasement members partially or fully encase or enclose the filler, so that the growth of the polycrystalline material which embeds the filler extends to the engagment surface(s) of the encasement member(s) to intrinsically shrink-fit the encasement member(s) to the ceramic composite structure. The encasement member may be made of any suitable material and have any desired shape capable of encasing at least a part of the filler. For example, it may be made of metal such as steel or stainless steel or a nickel alloy such as that sold under the trademark INCONEL. The encasement member may be perforated or be of foraminous construction in order to admit a vapor-phase oxidant therethrough. In certain cases, it may be desirable or necessary to coat the encasement member or provide it with a layer which protects such member from either oxidation, attack by parent metal and/or filler, or both, under the conditions of the process.

Referring now to the drawings, FIG. 1 shows an assembly 10 having a reservoir chamber 12 and an encasement member 14 positioned below and connected to reservoir chamber 12 by an opening (unnumbered) in the floor 28 of reservoir chamber 12. Encasement member 14 is comprised of a screen 16 and a perforated cylinder 18 which, like screen 16, is substantially cylindrical in configuration. The interior engagement surface of encasement member 14 is defined by screen 16 (FIGS. 1 and 1A) contained within and reinforced by perforated cylinder 18. Cylinder 18 serves as an outer, rigid member which reinforces cylindrical screen 16 and has formed therein a pattern of perforations 20 (FIG. 1A). Cylinder 18 is rigid enough to retain during processing the shape of a bed 38 of conformable filler contained therein. Screen 16 may be a refractory cloth or a metal, e.g., a stainless steel screen. In the illustrated embodiment it is a woven, open mesh stainless steel screen, many of the openings of which are aligned with perforations 20 of cylinder 18, so that encasement member 14 is foraminous and therefore open to entry therein of the surrounding atmosphere. A plurality of angle iron braces 22 are positioned at spaced locations about the outer surface of cylinder 18 and held in place by clamp rings 32 to reinforce the structure. A base 24, which may be either of solid or foraminous construction, closes the bottom of encasement member 14.

Reservoir chamber 12, which is also of cylindrical configuration and of a diameter larger than encasement member 14, is enclosed by reservoir walls 26 and a floor 28, which are of imperforate construction. In the illustrated embodiment, a bed 30 of particulate inert material supports a parent metal reservoir body 34 within reservoir chamber 12. The reservoir body 34 has an upper portion of generally cylindrical configuration joined to an inwardly tapering cone-shaped portion from which an extension protrudes to contact, at the bottom of floor 28, source body 36 which is of elongated, generally cylindrical configuration and of a diameter considerably less than that of reservoir body 34. Source body 36 has a series of three generally cylindrical or disc-shaped protrusions 36a, 36b and 36c and is emplaced within the bed of filler 38 contained within encasement member 14.

Encasement member 14 is filled with a bed of conformable filler 38 within which source body 36 is embedded and extends as a cylindrical core of parent metal within a sheath of filler bed material. Source body 36 and/or filler 38 may be treated with or include a dopant of facilitate the oxidation reaction. One or more dopants may be alloyed within the parent metal and one or more dopants may be externally applied to source body 36 or parts thereof. In addition, or in lieu thereof, one or more dopants may be applied to filler 38, at least in the vicinity of source body 36. The particulate inert material 30 within reservoir chamber 12 is non-wettable by, and therefore inert and impermeable to, the flow of molten parent metal therethrough so that formation and growth of oxidation reaction product through the bed of inert material 30 is not possible. Accordingly, a reservoir of molten parent metal is available for gravity flow into source body 36 to replenish parent metal which has infiltrated, and been oxidized within, bed 38 of conformable filler. For example, in the case of an aluminum parent metal, inert material 30 may comprise particulate EL ALUNDUM, a product of Norton Company. In some cases it may be desirable to isolate or protect reservoir chamber 12 from the surrounding atmosphere. In such cases, a reservoir cover plate may be employed to close the top opening of reservoir chamber 12 against the surrounding atmosphere and a sealing plate may be employed to close the opening (unnumbered) between reservoir chamber 12 and encasement member 14, except for an opening to admit parent metal therethrough.

By packing the bed of conformable filler 38 within encasement member 14, it conforms to the interior or engagement surface of member 14 defined by screen 16, whereby the interior configuration of the encasement member 14 defines the surface boundary of the bed of filler and the member to which the ceramic composite structure is intrinsically shrink-fitted. Further, such packing also conforms the filler to the shape of source body 36 so that the latter defines and fills a shaped cavity within the mass of conformable filler 38.

The assembly 10 is placed within a furnace which contains, or into which is introduced, a suitable vapor-phase oxidant if such is employed. (Otherwise, an inert gas or vacuum is employed.) The vapor-phase oxidant may comprise atmospheric air, in which case suitable vents in the furnace may be utilized to supply a source of the vapor-phase oxidant simply by the admission of air to the furnace interior. Filler-bed assembly 10 may be supported in an upright position within the furnace by any suitable support means, not shown. Reservoir chamber 12 is maintained above encasement member 14 so that molten parent metal flows by gravity from reservoir body 34 to source body 36. The vapor-phase oxidant enters the bed of conformable filler 38 through perforations 20 of cylinder 18 and the apertures of foraminous screen 16.

The growth of the oxidation reaction product proceeds, as described above, as molten metal is drawn through the growing body of oxidation reaction product to be oxidized on the surface thereof and form additional oxidation reaction product. As shown in the Figures when the growing polycrystalline material reaches foraminous screen 16, further growth thereof is stopped by the barrier means provided by screen 16, backed by cylinder 18. The polycrystalline material thus grows to completely fill the encasement member 14 and is thus intrinsically fitted to it. Because the growth of polycrystalline material is stopped by the barrier means effectively provided by encasement member 14, it fully fills the latter and is intrinsically fitted thereto. The growing polycrystalline material is essentially fully conformed against the encasement member so it is securely retained, and upon cooling is encased therein. Further, when cylinder 18 comprises a material having a higher coefficient of thermal expansion than the ceramic composite body, e.g., when it comprises a metal such as stainless steel or a nickel alloy such as INCONEL alloy, and such composite body is composed as per Example 1 herein, a thermal shrink-fit is also attained. Thus, when the assembly is heated to the reaction temperature, the stainless steel or nickel alloy cylinder expands and the polycrystalline material grows to fill the thermally expanded cylinder. Upon cooling of the assembly, both the ceramic composite structure and the encasement cylinder contract. However, because the thermal expansion and contraction of the steel or nickel alloy cylinder 18 is significantly greater than most of the ceramic material of structure 40, a tight shrink-fit of cylinder 18 around the ceramic composite structure 40 is attained as the structure cools after completion of processing which enhances the properties of ceramic structure 40 by creating a favorable prestress thereon.

Removal of the ceramic composite structure may be attained by disassembling filler-bed assembly 10. Release of the clamp rings 32 will release the angle iron braces 22 and permit separation therefrom and from base 24 of the ceramic composite structure 40 having encasement member 14 intrinsically shrink-fitted thereabout. Encasement member 14 is thus permanently mounted on ceramic composite structure 40. The ceramic composite structure 40 may be cut transversely at or near the upper (as viewed in FIG. 1) portion of encasement member 14 to provide a substantially cylindrical shaped, encased ceramic composite structure as shown in FIG. 2. Ceramic composite structure 40 has an interior bore 42 which is an inverse replication of the shape of source body 36, including a series of three enlarged chambers (only two of which, 42a and 42b are visible in FIG. 2). The enlarged chambers are the inverse replicates of the cylindrical shaped protrusions 36a, 36b and 36c, respectively, of source body 36. Resolidified parent metal which forms in bore 42 when the assembly is cooled after completion of the oxidation reaction may be removed in any suitable way, if desired. For example, a bore of approximately the diameter of bore 42 may be drilled to remove the bulk of the resolidified parent metal and the remaining parent metal, mostly within the enlarged chambers, e.g., 42a and 42b, be removed by chemical dissolution. For example, hydrochloric acid may be so used in the case of aluminum parent metal. The hydrochloric acid dissolves the aluminum but does not deleteriously affect the ceramic composite structure. In some cases, it may be desired to leave the parent metal core or a portion of it in place to produce a finished product having a metal core.

The outer surface of ceramic composite structure 40 conforms to the interior cylindrical surface of screen 16, i.e., is congruent thereto, and the rough or patterned surface penetrating the weave pattern of the screen helps to lock the intrinsically shrink-fitted encasement member, i.e., encasement member 14, in place. Inwardly-protruding members may be provided on cylinder 18 to enhance the strength of the intrinsic fitting. For some configurations of encasement member 14, it may be necessary or desireable to provide by means of an elbow-type connection one or more additional metal reservoirs for introduction of molten parent metal at several points to source body 36 in order to facilitate growth of the oxidation reaction product throughout the entire volume of filler bed 38.

As illustrated in FIGS. 2 and 2A, the encasement member, e.g., comprising cylinder 18, intrinsically shrink-fitted about the ceramic composite structure 40, may serve to provide a means upon which another member may be mounted. FIGS. 2 and 2A illustrated an embodiment in which the ceramic composite structure 40 having the encasement member 14 thereon further has a flanged pipe member 44 mounted on encasement member 14. This is attained by fitting the encased ceramic structure with a pipe member 44 which has a flange 44a at one end thereof. Pipe member 44 may be of solid imperforate construction such as a section of pipe or tubing and may have a second flange (not shown) fixed at its end opposite from that on which flange 44a is fixed, to provide a flanged conduit having a ceramic composite structure core having a bore 42 extending therethrough. Pipe member 44 may be spot welded at the outer face of flange 44a (and at its opposite end) to perforated cylinder 18, if desired or necessary.

An advantage of the construction illustrated in FIGS. 2 and 2A is the ability to grow the ceramic composite structure into engaging contact with a heated, thermally expanded perforated cylinder 18 to provide, upon cooling, a shrink-fitted metal-encased ceramic core structure. The advantage of the technique of the invention over the known techniques of shrink-fitting a metal sleeve about a preexisting ceramic core, is the requirement in the known techniques to attain extremely close tolerances of the outside diameter of the ceramic core and the inside diameter of the metal sleeve. These close tolerances are necessary in order that the thermal expansion and contraction differential between the ceramic core and metal sleeve lies within a narrow range which will enable the heated sleeve to slide over the ceramic core and, upon cooling, contract to provide the proper amount of gripping force on the ceramic core. The close tolerances are further required to assume close conformity between the metal and ceramic surface to avoid high contact stresses which can induce failure in the ceramic body. The technique of the present invention does not require machining of the ceramic core and metal cylinder to attain such close tolerances. Instead, a metal cylinder of suitable diameter is selected and the ceramic composite structure is grown within and to the interior surface of the cylinder to closely engage and conform to the latter. The cylinder, or an interior lining of the cylinder, provides a barrier means to, but not beyond, which the oxidation reaction product will grow, thereby providing an exact, intrinsic fit. With a suitable thermal expansion differential between the cylinder and ceramic composite body, the proper level of prestress is induced upon cooling of the assembly. In cases where the encasing metal must not be of perforate construction, a sleeve or pipe length of suitable imperforate construction may be fitted thereover, as illustrated in FIGS. 2 and 2A by pipe member 44.

The ceramic composite structure to which the encasement member is intrinsically shrink-fitted comprises, as noted above, a ceramic matrix embedding a filler which may be a conformable filler or a shaped preform body, as described in detail above. One suitable class of filler component includes those chemical species which, under the temperature and oxidizing conditions of the process, are not volatile, are thermodynamically stable and do not react with or dissolve excessively in the molten parent metal. Numerous materials are known to those skilled to the art as meeting such criteria in the case where aluminum parent metal and air or oxygen as the oxidant is employed. Such materials include the single-metal oxides of: aluminum, $Al_2O_3$; cerium, $CeO_2$; hafnium, $HfO_2$; lanthanum, $La_2O_3$; neodyium, $Nd_2O_3$; praseodymium, various oxides; samarium, $Sm_2O_3$; scandium, $Sc_2O_3$; thorium, $ThO_2$; uranium, $UO_2$; yttrium, $Y_2O_3$; and zirconium, $ZrO_2$. In addition, a large number of binary, ternary, and higher order metallic compounds such as magnesium aluminate spinel, $MgO.Al_2O_3$, are contained in this class of stable refractory compounds.

A second class of suitable filler or filler components are those which are not intrinsically stable in the oxidizing and high temperature environment of the preferred embodiment, but which, due to relatively slow kinetics of the degradation reactions, can be incorporated as a filler phase within the growing ceramic body. An example of commercial importance is SiC. This material would oxidize completely under the conditions necessary to oxidize aluminum with oxygen or air in accordance with the invention were it not for a protective layer of silicon oxide forming and covering the SiC particles to limit further oxidation of the SiC. The protective silicon oxide layer also enables SiC particles to sinter or bond to themselves and to other components of the filler.

A third class of suitable filler materials are those, such as carbon fibers, which are not, on thermodynamic or on kinetic grounds, expected to survive certain of the oxidizing environments necessary for practice of certain embodiments of the invention or the exposure to molten aluminum involved with the preferred embodiment, but which can be made compatible with the process of the present invention if (1) the environment is made less active, for example, through the use of $H_2O$ or $CO/CO_2$ as the oxidizing gases, or (2) through the application of a coating thereto, such as aluminum oxide, which makes the species kinetically non-reactive in the oxidizing environment.

Generally, among fillers found to be useful are one or more of aluminum oxide, silica, silicon carbide, silicon aluminum oxynitride, zirconium oxide, barium titanate, boron nitride, silicon nitride, magnesium aluminate, ferrous alloys, iron-chromium-aluminum alloy, carbon and aluminum.

As a further embodiment of the invention and as explained in the Commonly Owned Patent and Patent Applications, the addition of dopant materials to the metal can favorably influence the oxidation reaction process. The function or functions of the dopant material can depend upon a number of factors other than the dopant material itself. These factors include, for example, the particular parent metal, the end product desired, the particular combination of dopants when two or more dopants are used, the use of an externally applied dopant in combination with an alloyed dopant, the concentration of the dopant, the oxidizing environment, and the process conditions.

The dopant or dopants (1) may be provided as alloying constituents of the parent metal, (2) may be applied to at least a portion of the surface of the parent metal embedment body, or (3) may be applied to the filler or to a part of the filler bed adjacent to the source body of parent metal, or any combination of two or more of techniques (1), (2) and (3) may be employed. For example, one or more dopants alloyed in the parent metal may be used in combination with one or more dopants externally applied to all or part of the surface of the embedment body of parent metal. In the case of technique (3), where a dopant or dopants are applied to the filler, the application may be accomplished in any suitable manner, such as by dispersing the dopants throughout part or the entire mass of filler as a coating on filler particles, or in particulate form, preferably including at least a portion of the bed of filler immediately adjacent the parent metal embedment body. Application of any of the dopants to the filler may also be accomplished by applying a layer of one or more dopant materials to and within the bed of filler, including any of its internal openings, interstices, passageways, intervening spaces, or the like, that render it permeable. A convenient manner of applying any of the dopant material is to merely soak the entire bed of filler in a liquid (e.g., a solution), of dopant material. A source of the dopant may also be provided by placing a rigid body of dopant in contact with and between at least a portion of the parent metal surface and the filler bed. For example, a thin layer of silicon-containing glass (useful as a dopant for the oxidation of an aluminum parent metal) can be placed upon a surface of the parent metal. When the aluminum parent metal (which may be internally doped with Mg) overlaid with the silicon-containing material is melted in an oxidizing environment (e.g., in the case of aluminum in air, between about 850° C. to about 1450° C., preferably about 900° C. to about 1350° C.), growth of the polycrystalline material into the permeable bed occurs. In the case where the dopant is externally applied to at least a portion of the surface of the parent metal, the polycrystalline oxide structure generally grows within the permeable filler substantially beyond the dopant layer (i.e., to beyond the depth of the applied dopant layer). In any case, one or more of the dopants may be externally applied to the parent metal surface and/or to the permeable bed. Additionally, dopants alloyed within the parent metal and/or externally applied to the parent metal may be augmented by dopant(s) applied to the filler bed. Thus, any concentration deficiencies of the dopants alloyed within the parent metal and/or externally applied to the parent metal may be augmented by additional concentration of the respective dopant(s) applied to the bed, and vice versa.

Dopants useful for an aluminum parent metal, particularly with air as the oxidant, include magnesium, zinc and silicon either alone or in combination with each other or in combination with other dopants, as described herein. These metals, or a suitable source of the metals, may be alloyed into the aluminum-based parent metal at concentrations for each of between about 0.1–10% by weight based on the total weight of the resulting doped metal. These dopant materials or a suitable source thereof, e.g., MgO, ZnO, or $SiO_2$, may be used externally to the parent metal. Thus, an alumina ceramic structure is achieveable for an aluminum-silicon alloy as the parent metal using air as the oxidant by using MgO as a surface dopant in an amount greater than about 0.0008 gram per gram of parent metal to be oxidized and greater than about 0.003 gram per square centimeter of parent metal surface upon which the MgO is applied.

Additional examples of dopant materials effective with aluminum parent metals oxidized with air include sodium, germanium, tin, lead, lithium, calcium, boron, phosphorus, and yttrium which may be used individually or in combination with one or more dopants depending on the oxidant and process conditions. Rare earth elements such as cerium, lanthanum, praseodymium, neodymium and samarium are also useful dopants, and herein again especially when used in combination with other dopants. All of the dopant materials, as explained in the Commonly Owned Patent and Patent Applications, are effective in promoting polycrystalline oxidation reaction product growth for the aluminum-based parent metal systems.

The ceramic composite structures obtained by the practice of the present invention will usually be a dense, coherent mass wherein between about 5% and about 98% by volume of the total volume of the composite structure is comprised of one or more of the filler components embedded within a polycrystalline matrix material. The polycrystalline matrix material is usually comprised of, when the parent metal is aluminum and air or oxygen is the oxidant, about 60% to about 98% by weight (of the weight of polycrystalline material) of interconnected alpha-alumina oxide and about 1% to 40% by weight (same basis) of non-oxidized constituents of the parent metal.

The prestressing features afforded by the present invention are particularly appropriate to the design and fabrication of internally pressurized bodies, such as might be employed, for example, as gun barrels or gun tubes. Gun barrels typically involve very high pressure interior environments which combine erosion, corrosion and contact wear, while requiring close tolerance, straightness, and, in many cases, a rifling geometry. By means similar to that illustrated in Example 1, a rifled or straightbore ceramic composite structure can be fabricated, which includes a metal sleeve shrunk fit so as to put such composite in compression. Upon firing the gun barrels it becomes pressurized and first unloads the compressive stresses on the ceramic composite before creating any tensile stresses therein. Consequently the ceramic composite can appear significantly stronger in tensile strength in the particular configuration than in a non-prestressed configuration. Ceramic composites similar in composition to that of Example 1 have been tested for particle erosion resistance and found to be two or more times lower in wear in such tests than a STELLITE alloy 6. STELLITE is currently employed as a gun barrel liner in machine guns. The present invention has particular advantage with respect to prior ceramic approaches to gun barrel lining owing to its unique potential for making very large ceramic-lined barrels as well as small barrels.

The invention is further illustrated by the following non-limiting example.

EXAMPLE 1

In order to prepare a ceramic composite structure having a metal sleeve directly thereon, a Schedule 40 tube (1 15/16 inches outside diameter) of INCONEL 601 metal alloy (International Nickel Co.) (corresponding to 18 of FIG. 1) 6 inches in length was perforated with a plurality of holes each 3/16 inch in diameter. The holes were drilled over the entire cylindrical body of the tube of ⅜ inch centers in a staffered row pattern. A 304 alloy stainless steel perforated sheet approximately 0.008 inches in thickness with 0.016 inch diameter holes was used as an interior liner (corresponds to 16 as FIG. 1) for the drilled INCONEL metal tube. The holes provided a 22% open area sheet. The perforated stainless steel was chosen to serve as a barrier for the present examples to matrix growth.

A parent metal member comprised of an aluminum alloy containing 10 percent silicon and 3 percent magnesium comprised a parent metal source body and a parent metal reservoir body as illustrated in FIG. 1. In this example, a parent metal reservoir body (corresponding to 34 of FIG. 1) was employed, of non-tapered, cylindrical configuration 2½ inches in diameter and 2 inches high and a parent metal source body (corresponding to 36 of FIG. 1) was ⅜ of an inch in diameter and 6 inches in length, and was joined at a screw thread configuration and was embedded within a mass of filler (corresponding to the mass of conformable filler 38 in FIGS. 1 and 1A) of a mixture of 5% by weight commerical sand (silica) and 95% by weight 90 grit, 38 ALUNDUM, a particulate alumina supplied by Norton Company. The filler mixture was heated to about 1250° C. for 24 hours then allowed to cool to ambient temperature, the cooled mixture was then milled and emplaced within stainless steel lined perforated Schedule 40 INCONEL tube. The parent metal source body was coated with a layer of wood glue (sold under the trademark ELMER'S) and sand. The reservoir body was embedded within a bed of 90 grit 38 ALUNDUM contained within a 304 alloy stainless steel chamber corresponding to 12 in FIG. 1 and having a 2 inch diameter hole in its floor (shown unnumbered in FIG. 1). The top of the INCONEL tube was welded to the periphery of the 2-inch hole. In order to support the resultant assembly in an upright position, the INCONEL tube portion thereof (corresponding to 14 in FIG. 1) was placed within a perforated 304 alloy stainless steel support cylinder of 3½ inches inside diameter and perforated with 3/32 inch diameter holes drilled to provide 40% open area of the support cylinder. The support cylinder was of a length to support the reservoir chamber (corresponding to 12 in FIG. 1) at the top of the support cylinder. This arrangement maintained the parent metal and filler assembly in a vertical position with the reservoir body directly vertically above the source body. The resultant supported assembly was placed on a refractory, open container and heated in a furnace having an air atmosphere for 10 hours at a temperature of 1245° C., was maintained at 1245° C. for 100 hours, and then cooled over a 30 hour period to 125° C., thereafter allowed to cool to ambient temperature. A ceramic composite body had grown within the encasement of the Schedule 40 INCONEL stainless steel cylinder and embedded the mass of filler. Upon cooling, the INCONEL encasement was found to provide a very tight fit about the ceramic composite body, and believed to provide a compressive stress to said ceramic composite body owing to a larger coefficient of thermal expansion. Upon removal of resolidified parent metal from the bore of the ceramic body by drilled and chemical (hydrochloric acid) treatment, a bore extending therethrough was exposed which inversely replicated the screw thread configuration of the original source body.

As illustrated in the above example, the direct conformation of the ceramic composite body to the INCONEL sleeve was achieved by the process of the present invention without any need for grinding of the ceramic/metal interface.

Although only a few exemplary embodiments of the invention have been described in detail above, those skilled in the art will readily appreciate that the present invention embraces many combinations and variations other than those exemplified.

What is claimed is:

1. A self-supporting ceramic composite structure comprising a filler, a polycrystalline ceramic matrix embedding said filler, said ceramic matrix comprising an interconnected oxidation reaction product of a precursor metal with an oxidant, and an encasement member comprising a sleave means superimposed onto said filler for maintaining said ceramic composite structure under compressive stress upon intimate engagement with said ceramic matrix developed in situ by intrinsic fit.

2. The ceramic composite structure of claim 1, wherein said encasement member comprises at least one metal selected from the group consisting of a stainless steel, an Inconel metal, a Fecral metal, a Fecralloy metal, a Hastalloy metal and an Incoloy metal.

3. The ceramic composite structure of claim 1, wherein said encasement member comprises a cylindrical sleeve and said ceramic composite body comprises a cylinder encased by said sleeve.

4. The ceramic composite structure of claim 1, further comprising at least about 1% through about 40% by volume metallic constituents in said ceramic matrix.

5. The ceramic composite structure of claim 1, wherein said precursor metal comprises aluminum and said oxidation reaction product comprises alpha-alumina.

6. The ceramic composite structure of claim 1, wherein said ceramic composite structure and said encasement member comprise a gun barrel or a gun barrel liner.

7. The ceramic composite structure of claim 1, wherein said precursor metal comprises at least one metal selected from the group consisting of silicon, titanium, tin, zirconium, and hafnium.

8. The ceramic composite structure of claim 1, wherein said oxidant comprises at least one of a solid, liquid, or vapor-phase oxidant.

9. The ceramic composite structure of claim 1, wherein said filler comprises at least one material selected from the group consisting of hollow bodies, particulates, fibers, platelets, rods, and pellets.

10. The ceramic composite structure of claim 1, further comprising means defining a core region comprising metal.

11. A gun barrel comprising a ceramic liner, sleeve means superimposed on said liner for maintaining said liner under compressive stress, said liner comprising a ceramic filler and a polycrystalline ceramic matrix embedding said filler, said polycrystalline ceramic matrix comprising (i) interconnected oxidation reaction product of a parent metal reacted with an oxidant.

12. The gun barrel of claim 11, wherein said ceramic liner comprises a rifled bore.

13. The gun barrel of claim 11, wherein said matrix is comprised of aluminum oxide, and said ceramic filler is comprised of aluminum oxide.

14. The gun barrel of claim 13, wherein said matrix further comprises aluminum.

15. The gun barrel of claim 14, wherein said aluminum comprises up to about 40 percent of said matrix by weight.

16. The gun barrel of claim 11, wherein said ceramic liner is formed by the oxidation of molten parent metal with an oxidant in a permeable tubular ceramic preform.

17. The gun barrel of claim 11 wherein said ceramic liner has a bore resulting from the displacement and oxidation of molten parent metal as said liner is formed.

18. The gun barrel of claim 17, wherein said ceramic liner is formed by the oxidation of molten parent metal with an oxidant in a porous mass of particulate ceramic filler surrounding a metal rod, and the infiltration and growth of the resulting ceramic oxidation reaction product into and through said mass of filler as molten metal from said rod is drawn continuously through said reaction product.

* * * * *